United States Patent
Anderson

(10) Patent No.: US 10,919,780 B2
(45) Date of Patent: Feb. 16, 2021

(54) REUSABLE FILTER CARTRIDGE FOR WATER PITCHER

(71) Applicant: Santevia Water Systems Inc., Delta (CA)

(72) Inventor: Yvonne Anderson, Delta (CA)

(73) Assignee: Santevia Water Systems Inc., Delta (CA)

(*) Notice: Subject to any disclaimer, the term of this patent is extended or adjusted under 35 U.S.C. 154(b) by 268 days.

(21) Appl. No.: 15/974,585

(22) Filed: May 8, 2018

(65) Prior Publication Data

US 2019/0345039 A1 Nov. 14, 2019

(51) Int. Cl.
*C02F 1/28* (2006.01)
*C02F 1/68* (2006.01)
*C02F 1/00* (2006.01)

(52) U.S. Cl.
CPC .............. *C02F 1/003* (2013.01); *C02F 1/283* (2013.01); *C02F 1/68* (2013.01); *C02F 2201/004* (2013.01); *C02F 2201/006* (2013.01); *C02F 2307/04* (2013.01)

(58) Field of Classification Search
None
See application file for complete search history.

(56) References Cited

U.S. PATENT DOCUMENTS

| 1,800,093 | A | * | 4/1931 | Menge | B01D 24/005 |
|---|---|---|---|---|---|
| | | | | | 210/120 |
| 2,604,991 | A | * | 7/1952 | Rogers | C02F 9/005 |
| | | | | | 210/206 |
| 3,348,689 | A | * | 10/1967 | Kraissl, Jr. | B01D 29/33 |
| | | | | | 210/238 |
| 8,043,502 | B2 | | 10/2011 | Nauta | |
| 9,005,437 | B2 | * | 4/2015 | Pedersen | C02F 1/002 |
| | | | | | 210/206 |
| 2011/0303618 | A1 | | 12/2011 | Cueman et al. | |
| 2012/0061312 | A1 | | 3/2012 | Busick et al. | |
| 2017/0007949 | A1 | | 1/2017 | Mayo | |

FOREIGN PATENT DOCUMENTS

GB 2504501 2/2014

* cited by examiner

*Primary Examiner* — Matthew O Savage
(74) *Attorney, Agent, or Firm* — Zeman-Mullen & Ford, LLP

(57) ABSTRACT

A reusable water filter cartridge comprises a housing having a water-permeable base and a body extending from the base. The base and the body define a cavity for receiving filter media. There is a water-permeable lid which is removably securable to the housing via interlocking connectors on the lid and the housing. The lid is securable to the housing by rotating the lid relative to the housing in a first rotational direction to engage the connectors on the lid and the housing with each other. The lid is releasable from the housing by rotating the lid relative to the housing in a second rotational direction which is opposite to the first rotational direction to disengage the connectors on the lid and the housing from each other. Water to be filtered enters the housing via the lid, passes through the filter media contained in the cavity, and exits the housing via the base.

9 Claims, 10 Drawing Sheets

REUSABLE FILTER CARTRIDGE FOR WATER PITCHER

TECHNICAL FIELD

The present disclosure relates to a reusable filter cartridge and, in particular, to a reusable filter cartridge for use with a water pitcher.

BACKGROUND

U.S. Pat. No. 8,043,502, which issued to Nauta on Oct. 25, 2011, discloses a filter cartridge for a household water filtration apparatus, and a method for filtering water using the household water filtration apparatus. The filter cartridge comprises a through-flow cartridge, which has an accessible cavity. The cartridge is removably received in the household water filtration apparatus. The filter cartridge further comprises a water permeable enclosure that contains filter media, which is removably received in the accessible cavity. The method comprises opening a through-flow cartridge, depositing a filter packet in the cartridge, closing the cartridge, depositing the cartridge in the household water filtration apparatus, and passing water through the cartridge.

United States Patent Application Publication No. 2017/0007949, which published in the name of Mayo on Jan. 12, 2017, discloses a filter cartridge and closure system comprising a filter cartridge for holding a filter pod that may be used, for example, to filter domestic water. In one embodiment, the filter cartridge and closure system enables the use of reusable filters in water pitchers, including reusable gravity-flow water filters.

United States Patent Application Publication No. 2012/0061312, which published in the name of Busick et al. on Mar. 15, 2012, discloses a filter cartridge having a cup shape that can be filled with a filtering material, and placed in a filtering device such as a water pitcher. The filter cartridge has a base, a side wall, and a flange defining the cup shape of the filter cartridge. A removable mesh insert may be affixed atop the flange, allowing replacement of the filtering material.

SUMMARY

There is provided a reusable water filter cartridge comprising a housing having a water-permeable base and a body extending from the base. The base and the body define a cavity for receiving filter media. There is a water-permeable lid which is removably securable to the housing via interlocking connectors on the lid and the housing. The lid is securable to the housing by rotating the lid relative to the housing in a first rotational direction to engage the connectors on the lid and the housing with each other. The lid is releasable from the housing by rotating the lid relative to the housing in a second rotational direction which is opposite to the first rotational direction to disengage the connectors on the lid and the housing from each other. Water to be filtered enters the housing via the lid, passes through the filter media contained in the cavity, and exits the housing via the base.

The reusable water filter cartridge may further include a removable divider received within the cavity of the housing. The divider may separate a first component of the filter media from a second component of the filter media. The first component of the filter media may comprise granular activated carbon and the second component of the filter media may comprise minerals. The divider may be water-permeable.

The interlocking connectors on the lid and the housing may include one or more male connectors on the lid operable to engage one or more female connectors on the housing. At least one of the lid and the base may comprise a mesh. At least one of the lid and the base may comprise a plurality of pores. The body may have a neck which defines an opening into the cavity. The neck may have a shoulder which provides a seat for the lid.

There is also provided a water pitcher for filtering water, the water pitcher comprising a housing with an interior and a handle extending from the housing. There is a pour spout in fluid communication with the interior of the housing. There is also a lid connected to the housing. The lid is actuable between a closed position and an opened position to selectively provide access to the interior of the housing. A receptacle divides the interior of the housing into an upper chamber and a lower chamber. The receptacle removably receives a filter cartridge.

The filter cartridge includes a filter housing having a water-permeable filter base and a filter body extending from the filter base. The filter base and the filter body define a cavity for receiving filter media. There is a water-permeable filter lid removably securable to the filter housing via interlocking connectors on the filter lid and the filter housing. The filter lid is securable to the filter housing by rotating the filter lid relative to the filter housing in a first rotational direction to engage the connectors on the filter lid and the filter housing with each other. The filter lid is releasable from the filter housing by rotating the filter lid relative to the filter housing in a second rotational direction which is opposite to the first rotational direction to disengage the connectors on the filter lid and the filter housing from each other.

Water to be filtered is received in the upper chamber and passes to the filter cartridge by gravity. The water enters the filter cartridge through the filter lid and passes through the filter media in the filter cartridge, thereby removing contaminants from the water. The filtered water exits the filter cartridge through the filter base and accumulates in the lower chamber of the water pitcher.

The receptacle may include a stepped portion and the filter cartridge may include a plurality of circumferentially spaced-apart ribs extending about the filter body. The ribs may abut the stepped portion when the filter cartridge is received in the receptacle.

The filter cartridge may further include a removable divider received within the cavity of the filter housing. The divider may be water-permeable and may separate a first component of the filter media from a second component of the filter media. The first component of the filter media may comprise granular activated carbon and the second component of the filter media may comprise minerals.

The interlocking connectors on the filter lid and the filter housing may include one or more male connectors on the filter lid operable to engage one or more female connectors on the filter housing. At least one of the filter lid and the filter base may comprise a mesh. At least one of the filter lid and the filter base may comprise a plurality of pores.

DESCRIPTION OF SPECIFIC EMBODIMENTS

Figure 1:
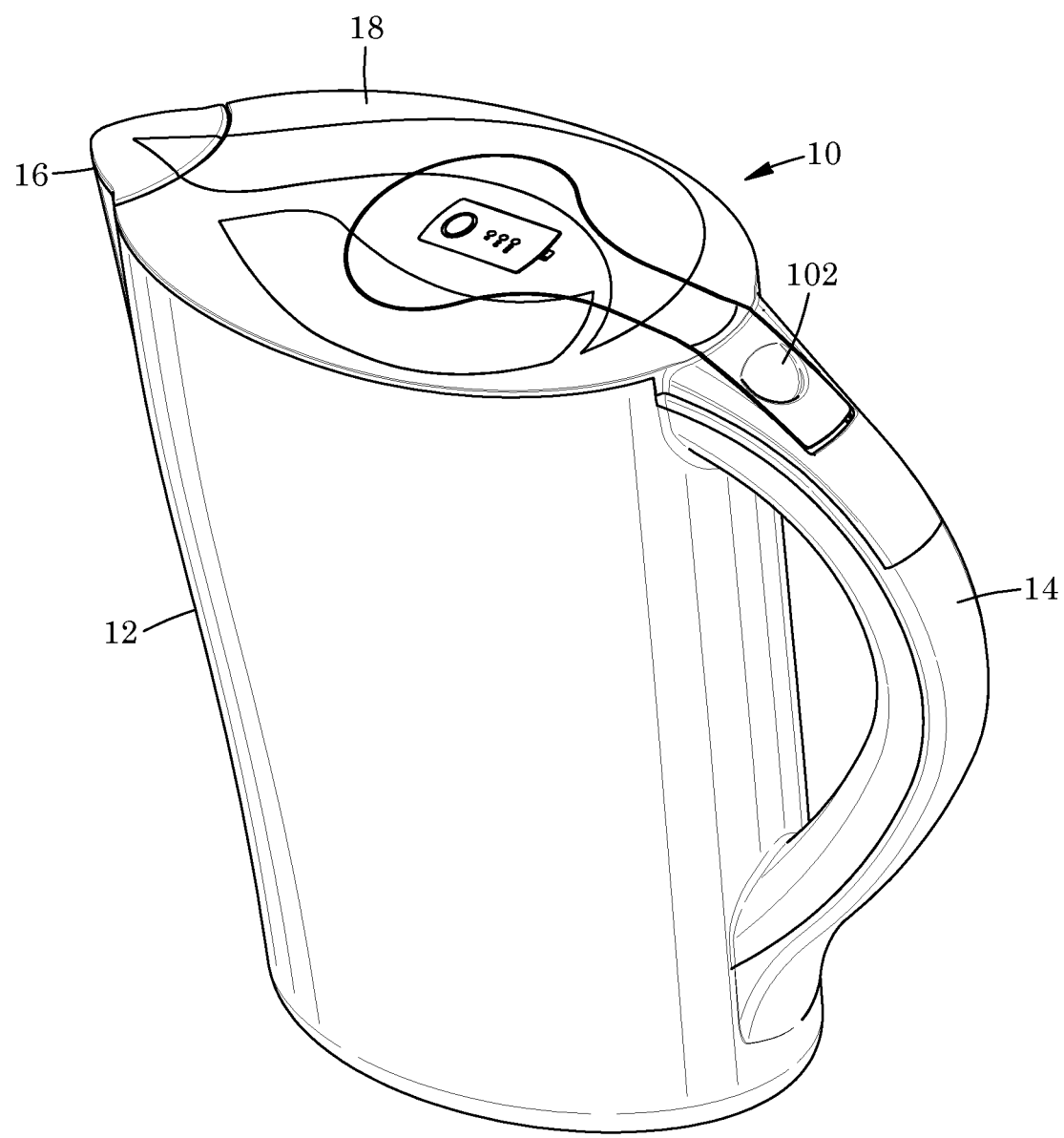
FIG. 1 is a side perspective view of a water pitcher.
Figure 2:
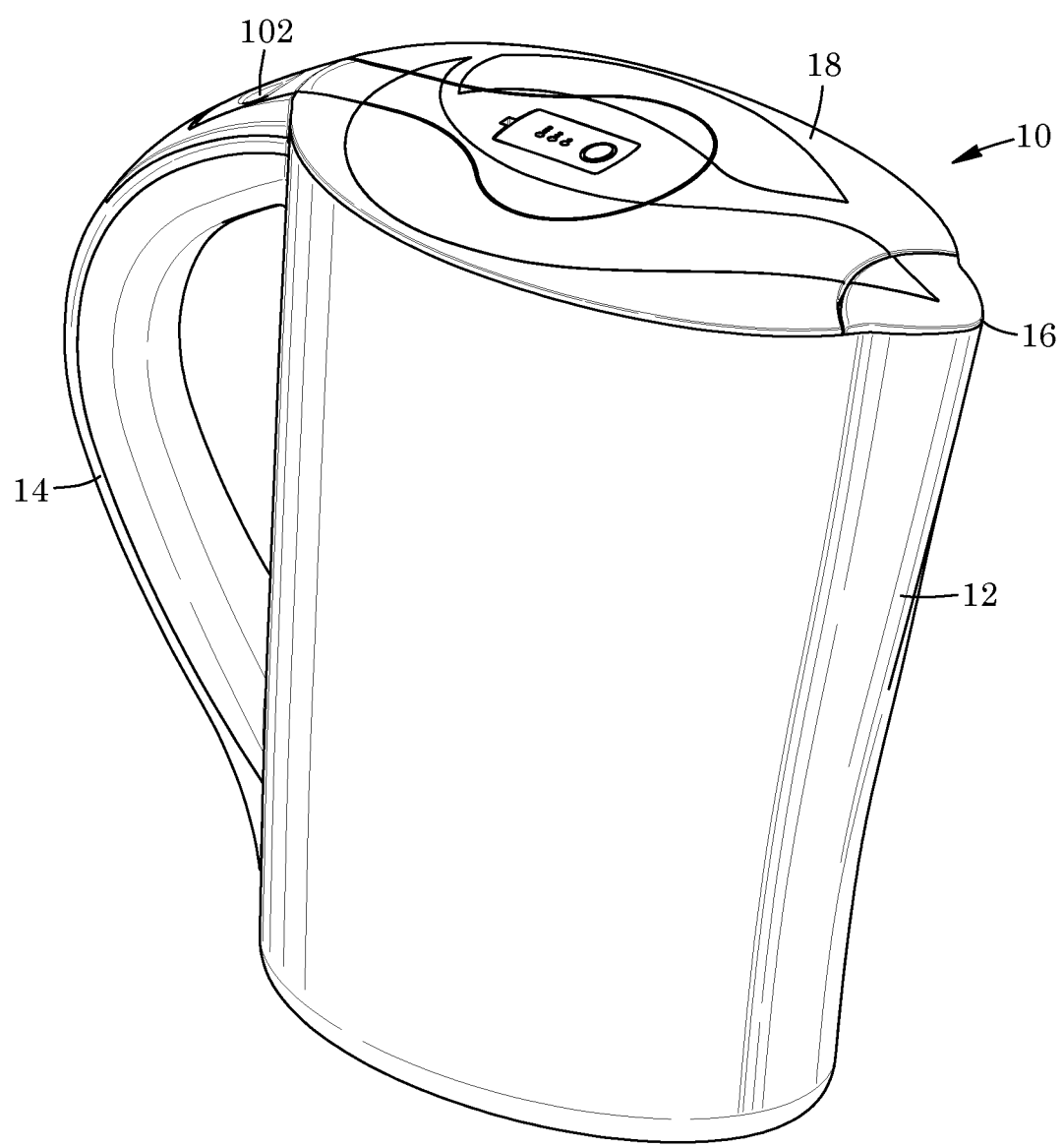
FIG. 2 is another side perspective view of the water pitcher of FIG. 1 showing the side opposite to the side shown in FIG. 1.
Figure 3:
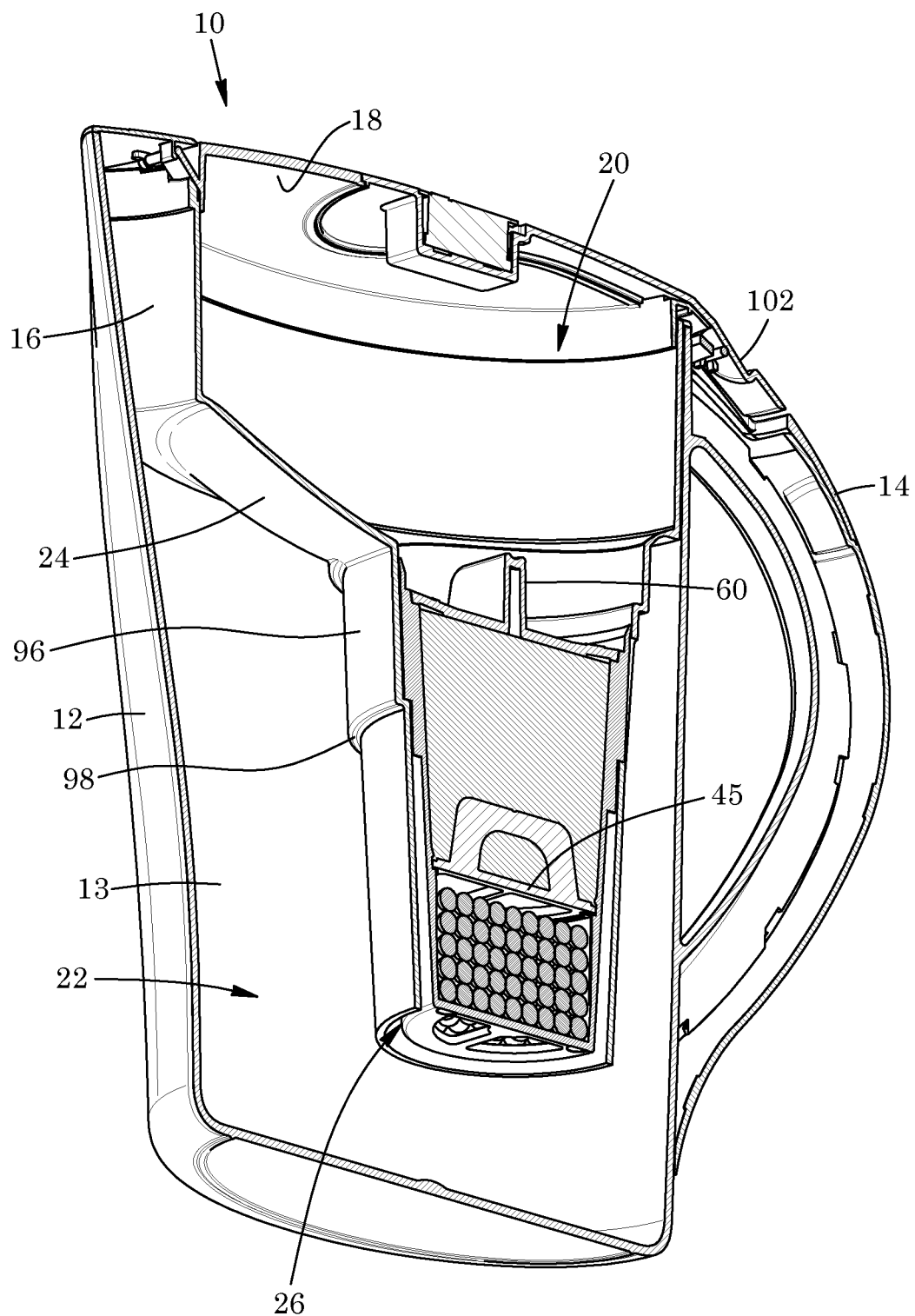
FIG. 3 is a cross-sectional view of the water pitcher of FIG. 1.

Referring to the drawings and first to FIGS. 1 and 2, there is shown a water filtration device which in this example is a water pitcher 10. The water pitcher 10 includes a housing 12, a handle 14, a pour spout 16, and a lid 18. As best shown in FIG. 3, an interior 13 of the housing 12 is divided into an upper chamber 20 and a lower chamber 22. The upper chamber 20 and the lower chamber 22 are separated by a receptacle 24 which removably receives a filter cartridge 26.

Figure 4A:
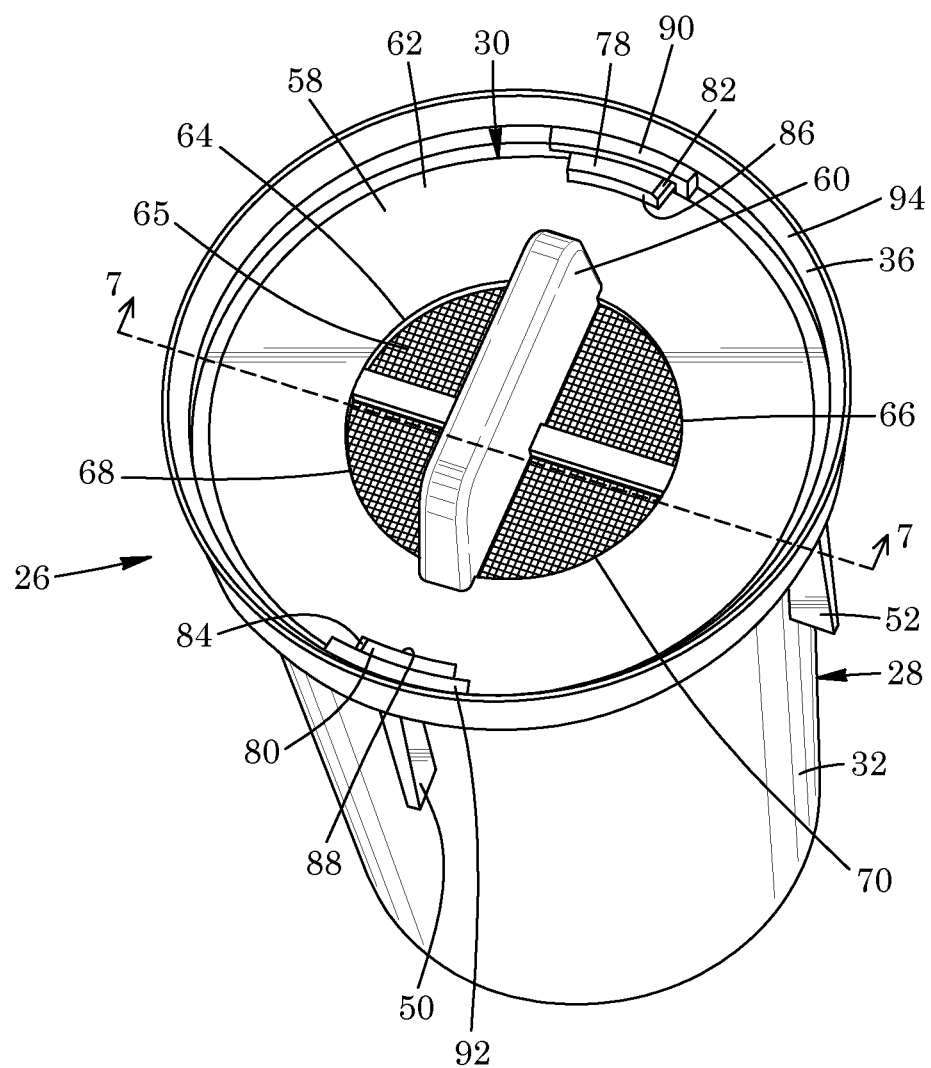
FIG. 4A is a top perspective view of a filter cartridge of the water pitcher of FIG. 1.
Figure 4B:
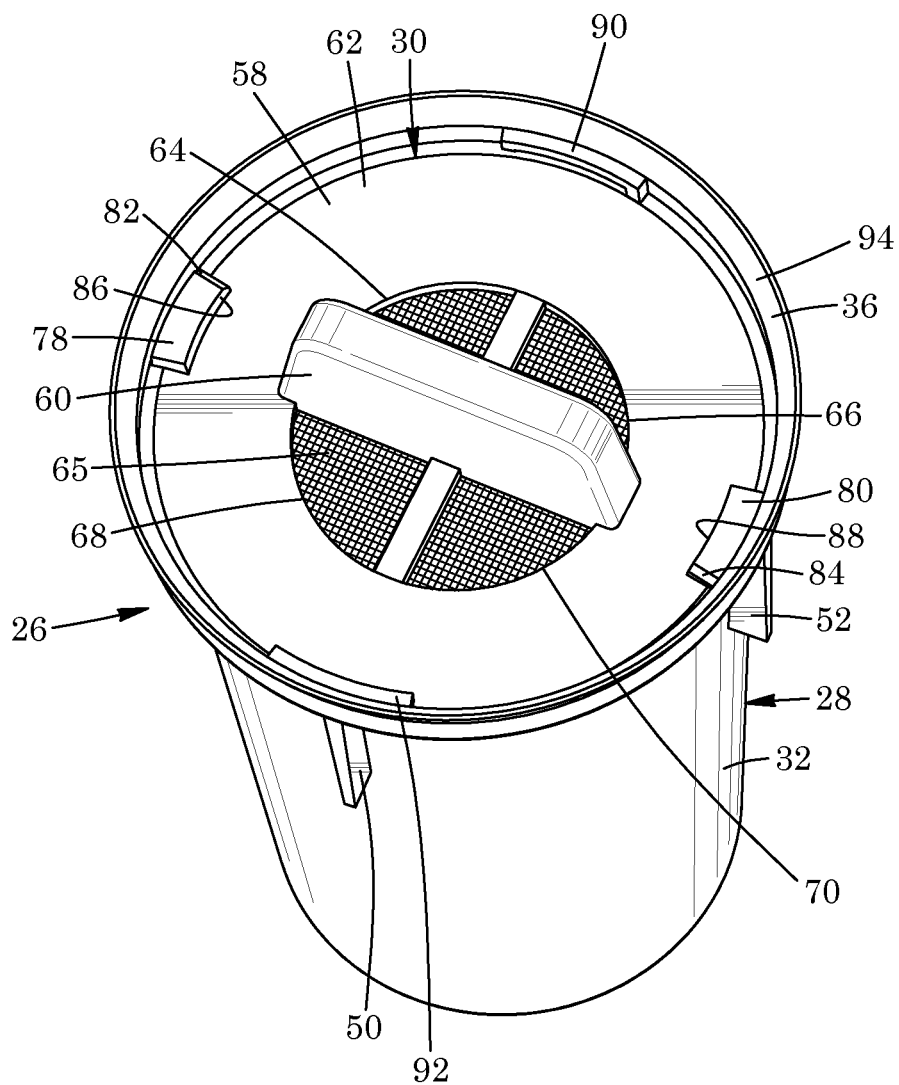
FIG. 4B is a top perspective view of the filter cartridge of the water pitcher of FIG. 1 showing a lid of the filter cartridge rotated substantially ninety degrees from the position shown in FIG. 4A.
Figure 5:
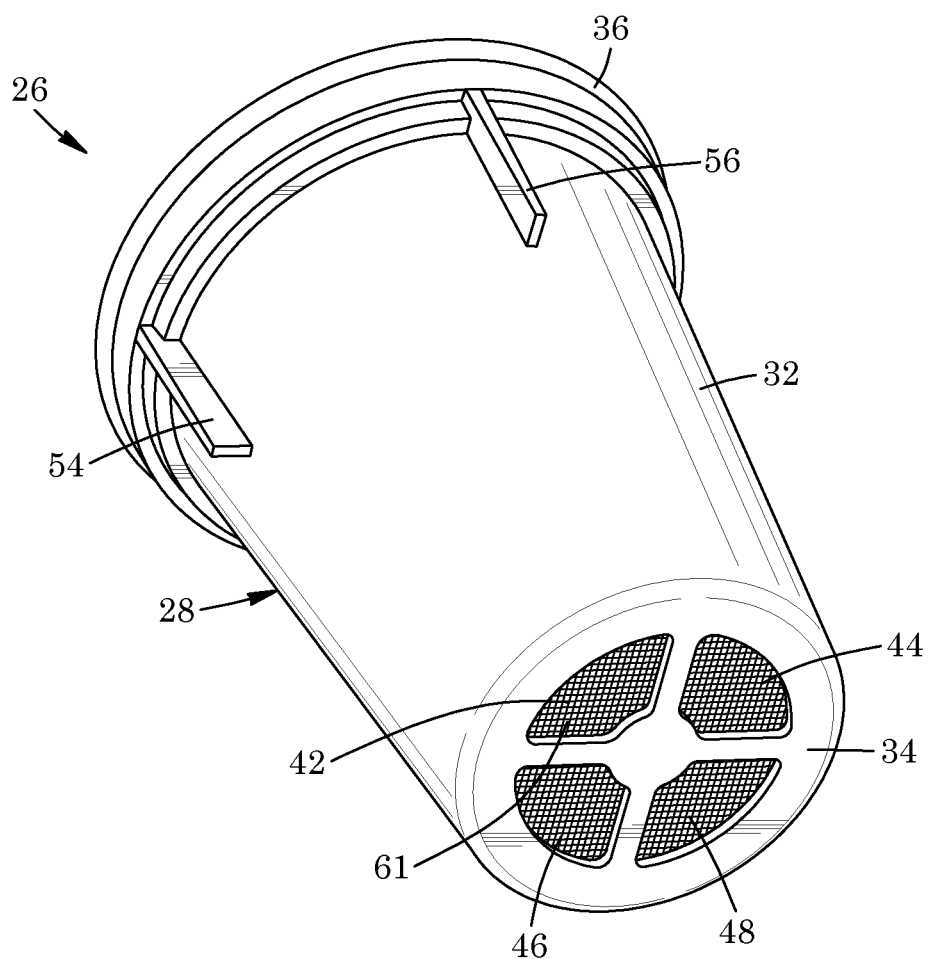
FIG. 5 is a bottom perspective view of the filter cartridge of FIGS. 4A and 4B.
Figure 6:
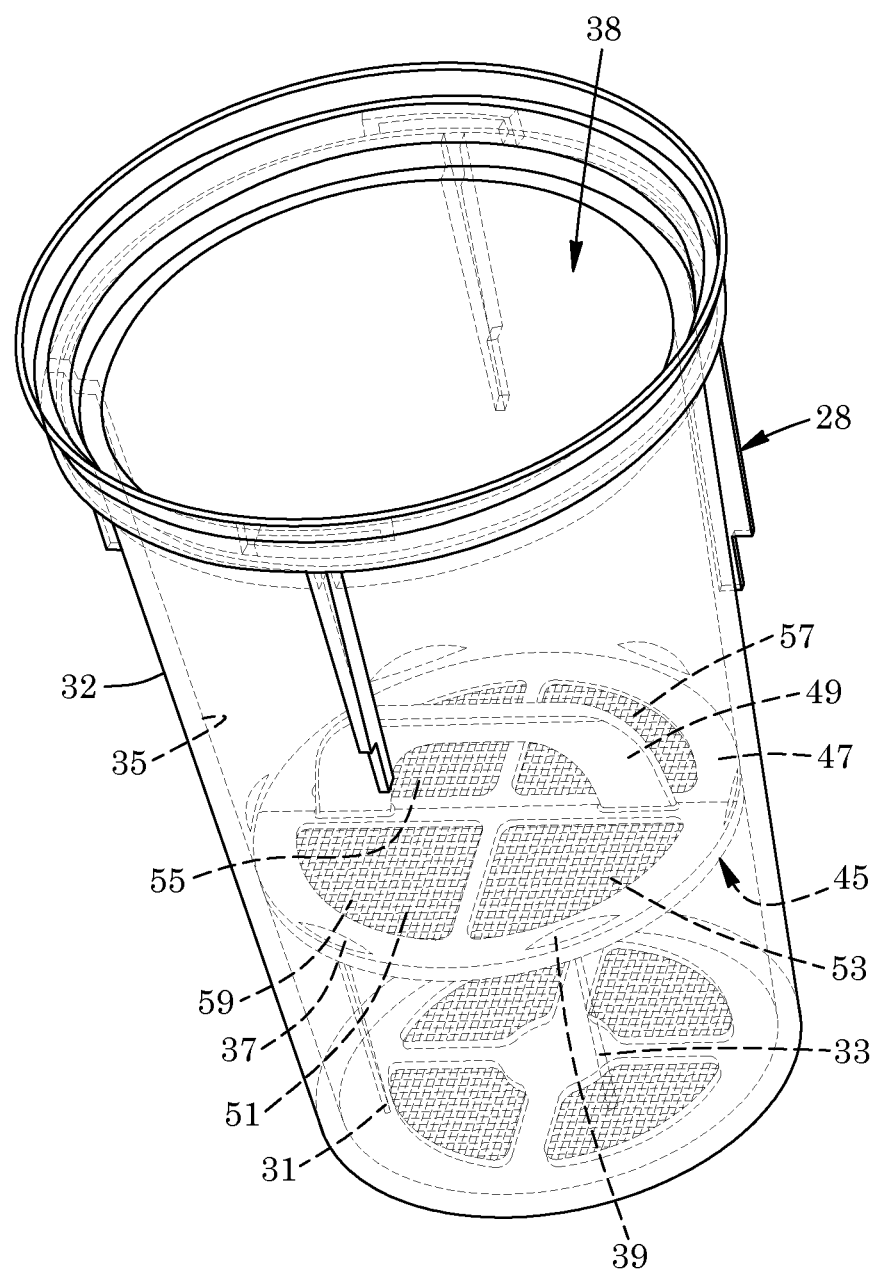
FIG. 6 is a perspective view of a housing of the filter cartridge of FIGS. 4A and 4B.
Figure 7:
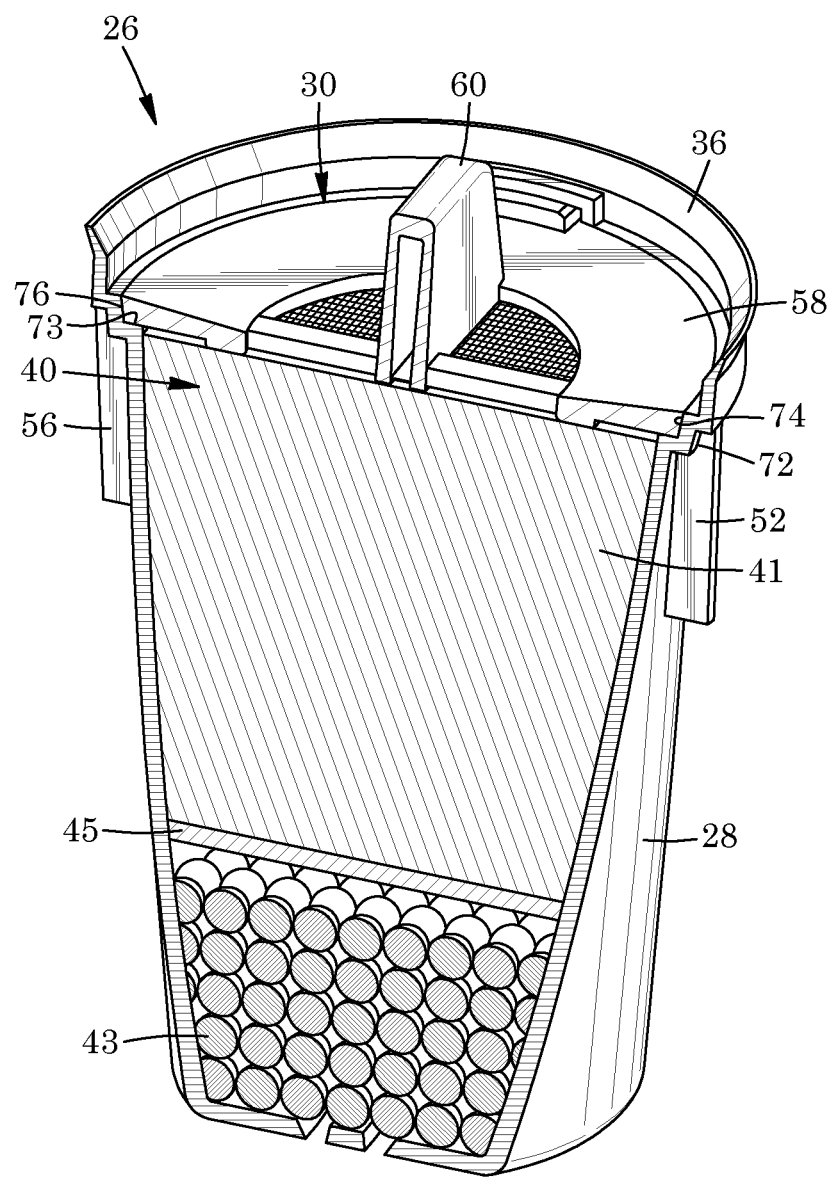
FIG. 7 is a cross-sectional view of the filter cartridge taken along line 7-7 of FIG. 4A.

Referring now to FIGS. 4A, 4B and 5, the filter cartridge 26 is shown in greater detail. The filter cartridge 26 includes a housing 28 and a lid 30 which is removably secured to the housing 28. In this example, the housing 28 comprises a generally cylindrical body 32 which extends longitudinally from a base 34 and terminates in a neck 36 as best shown in FIG. 5. The body 32 is frusto-conical in shape and increases in circumference from the base 34 towards the neck 36 in this example. The body 32 defines an interior cavity 38, best shown in FIG. 6, which is configured to receive filter media 40 as shown in FIG. 7. In this example, the filter media 40 comprises granular activated carbon 41 and minerals 43. There may be a removable divider 45 which separates the granular activated carbon 41 from the minerals 43.

Referring back to FIG. 6, the divider 45 includes a disc member 47 and a handle 49 extending substantially perpendicularly from the disc member. There may be a plurality of circumferentially spaced-apart ribs, for example, ribs 31 and 33 extending inwardly from and about an inner wall 35 of the body 32. There may also be a plurality of circumferentially spaced-apart protrusions, for example, protrusions 37 and 39 extending inwardly from and about the inner wall 35 of the body 32. The ribs 31 and 33 and the protrusions 37 and 39 function together to support and maintain the position of the divider 45 within the body 32. The protrusions 37 and 39 are generally semi-circular in shape in this example, and are shaped to allow the disc member 47 to pass over during insertion while inhibiting inadvertent removal of the divider 45 until sufficient force has been applied by a user. There may be one or more apertures, for example, apertures 51, 53, 55 and 57 extending through the disc member 47. Each of the apertures 51, 53, 55 and 57 has a generally circular sector shape in this example, but may be a different shape in other examples. Each of the apertures 51, 53, 55 and 57 is covered by a mesh in this example as shown by mesh 59 for the aperture 51. However, the apertures 51, 53, 55 and 57 may also be covered by a membrane or other water-permeable material which allows water to pass through the granular activated carbon 41 and through the disc member 47 to the minerals 43. Alternatively, each of the apertures 51, 53, 55 and 57 may comprise a plurality of pores of sufficient size to allow water to pass through the granular activated carbon 41 and through the disc member 47 to the minerals 43 while maintaining separation of the granular activated carbon and minerals.

Referring back to FIG. 5, in this example, the base 34 is circular in shape and includes one or more apertures, for example, apertures 42, 44, 46 and 48. Each of the apertures 42, 44, 46 and 48 has a generally curved trapezoidal shape in this example, but may be a different shape in other examples. Each of the apertures 42, 44, 46 and 48 is covered by a mesh in this example as shown by mesh 61 for the aperture 42. However, the apertures 42, 44, 46 and 48 may also be covered by a membrane or other water-permeable material which allows water to pass through the base 34 and exit the filter cartridge 26 while inhibiting the escape of the filter media 40. Alternatively, each of the apertures 42, 44, 46 and 48 may comprise a plurality of pores of sufficient size to allow water to pass through the base 34 and exit the filter cartridge 26 while inhibiting the escape of the filter media 40. There is a plurality of circumferentially spaced-apart ribs, for example, ribs 50, 52, 54 and 56 extending outwardly about the body 32. In this example, the ribs 50, 52, 54 and 56 extend downwardly from the neck 36 part way towards the base 34 and taper slightly along each of their lengths towards the base 34.

Referring back to FIGS. 4A and 4B, the lid 30 includes an annular member 58 and a handle 60 extending upwardly from a top surface 62 of the annular member 58. The handle 60 has an isosceles trapezoid profile in this example but may be other shapes. The annular member 58 includes one or more apertures, for example, apertures 64, 66, 68 and 70. Each of the apertures 64, 66, 68 and 70 has a generally circular sector shape in this example, but may have a different shape in other examples. Each of the apertures 64, 66, 68 and 70 is covered by a mesh as shown by mesh 65 for the aperture 64. However, the apertures 64, 66, 68 and 70 may also be covered by a membrane or other water-permeable material which allows water to pass through the lid 30 and enter the filter cartridge 26 while inhibiting the escape of the filter media 40. Alternatively, each of the apertures 64, 66, 68 and 70 may comprise a plurality of pores of sufficient size to allow water to pass through the lid 30 and enter the filter cartridge 26 while inhibiting the escape of the filter media 40.

As best shown in FIG. 7, the neck 36 of the housing 28 includes a shoulder 72 which provides a seat 73 for the annular member 58 of the lid 30. The shoulder 72 has an inside perimeter 74 which is generally circular in this example and is complementary in shape to an outer circumference 76 of the annular member 58. This allows the annular member 58 to nest against the shoulder 72 and ensures a tight fit between the lid 30 and the housing 28 so as to inhibit the escape of the filter media 40 contained within the housing 28.

The lid 30 is removably secured to the housing 28 via interlocking connectors which are shown in FIGS. 4A and 4B. In this example, the annular member 58 is provided with one or more male connectors, for example, male connectors 78 and 80 on the top surface 62. The male connectors 78 and 80 in this example are generally curved rectangular projections each having a chamfered edge as shown by chamfered edge 82 for the male connector 78 and chamfered edge 84 for the male connector 80. Each of the male connectors 78 and 80 also has a concave inner face in this example as shown by concave inner face 86 for the male connector 78 and concave inner face 88 for the male connector 80. In this example, the neck 36 of the housing 28 is provided with one or more female connectors, for example, female connectors 90 and 92. The female connectors 90 and 92 in this example are generally curved L-shaped projections which extend from an interior 94 of the neck 36 as best shown by female connector 90 in FIG. 8.

Figure 8:
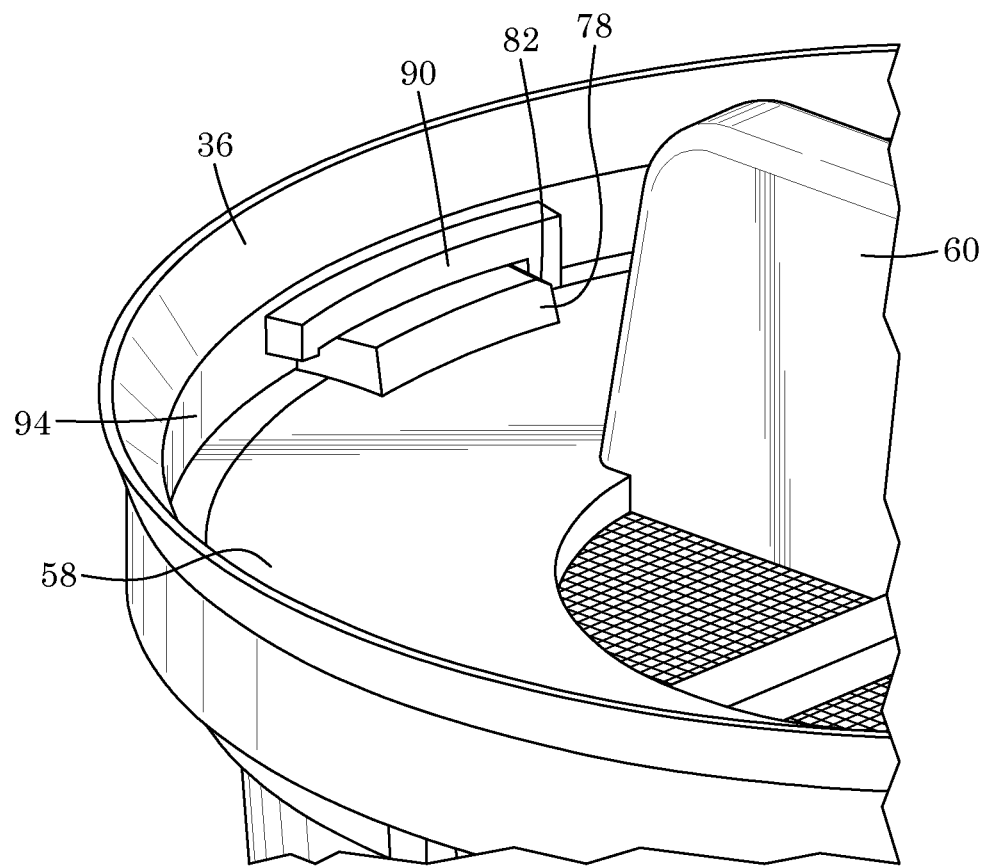
FIG. 8 is an enlarged, fragmentary view of a portion of the filter cartridge of FIGS. 4A to 6.

The female connectors 90 and 92 are each shaped to receive a corresponding one of the male connectors 78 and 80 as best shown in FIG. 8 by the female connector 90 which receives the male connector 78. The male connectors 78 and 80 are brought into engagement with the female connectors 90 and 92 by rotating the lid 30 in a first rotational direction using the handle 60. The male connectors 78 and 80 interlock with the female connectors 90 and 92 to secure the lid 30 to the housing 28. The male connectors 78 and 80 can be disengaged from the female connectors 90 and 92 by rotating the lid 30 in a second rotational direction opposite to the first rotational direction using the handle 60. FIG. 4B shows the lid 30 rotated substantially ninety degrees from the position shown in FIG. 4A. The lid 30 can then be removed from the housing 28 to allow a user access to the cavity 38 of the housing 28. This allows the filter media 40 to be inserted into and removed from the housing 28 as required.

Figure 9:
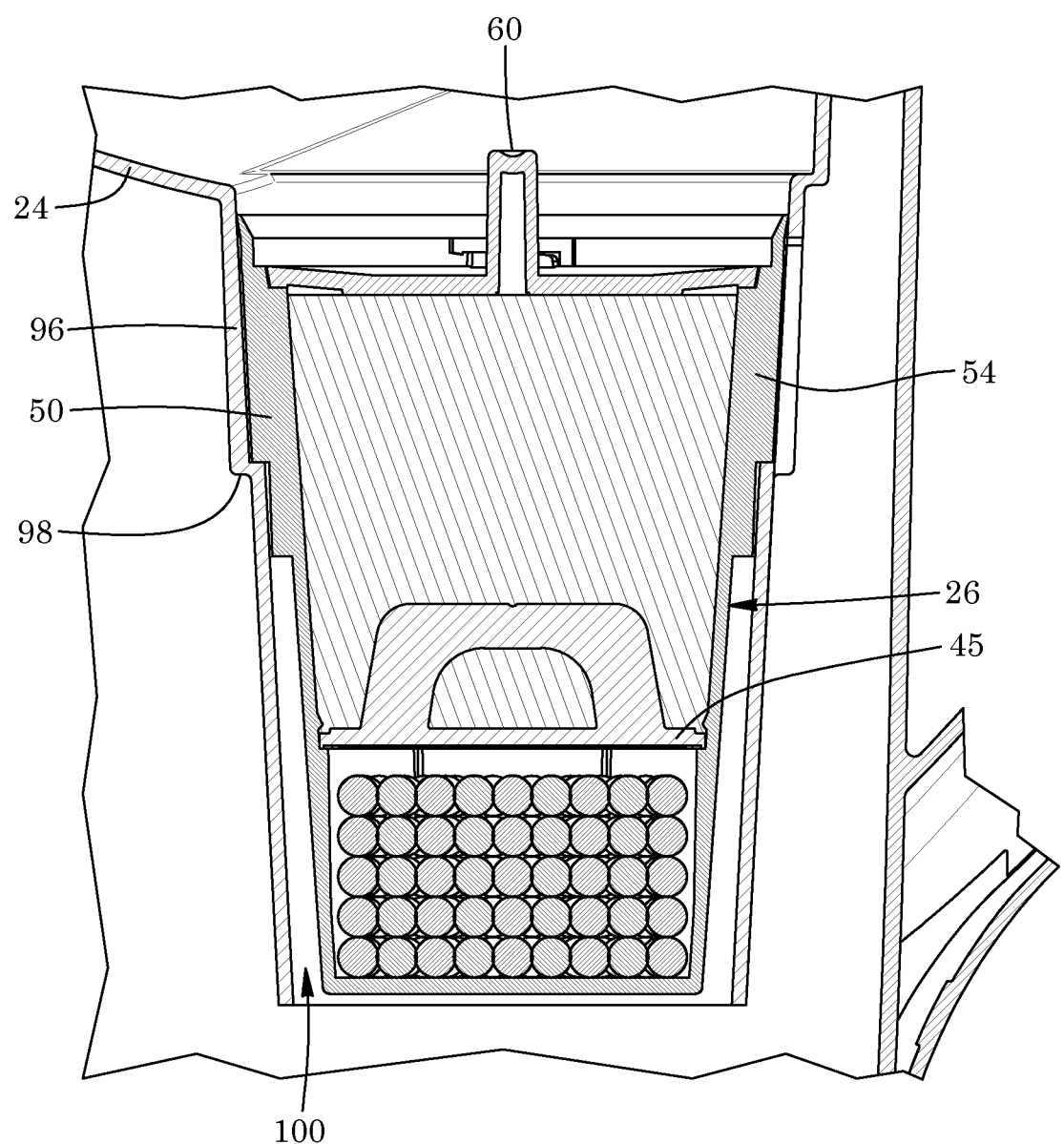
FIG. 9 is an enlarged, fragmentary view of a portion of the water pitcher of FIG. 1 showing the filter cartridge of FIGS. 4A to 8 received therein.

Referring now to FIG. 9, the filter cartridge 26 is removably received in the receptacle 24 of the water pitcher 10. In this example, the receptacle 24 has a tapered lower body 96 which is generally sleeve-like and has an inner circumference that snugly receives the filter cartridge 26 therein. The ribs of the filter cartridge 26 abut a stepped portion 98 of the lower body 96 as shown by ribs 50 and 54. The stepped portion 98 supports and maintains the position of the filter cartridge 26 within the lower body 96. The lower body 96 terminates in a bottom opening 100 in this example. The filter cartridge 26 is substantially contained within the lower body 96 of the receptacle 24 in this example, but may extend through the bottom opening 100 in other examples. As best shown in FIG. 3, the filter cartridge 26 connects the upper chamber 20 and the lower chamber 22 of the interior 13 of the water pitcher 10.

The upper chamber 20 functions as a feed water reservoir and receives water to be filtered by the filter cartridge 26. The lid 18 can be opened to provide access to the upper chamber 20 so that it can be filled with water. The lid 18 may be hingedly connected to the handle 14, and may be actuated between a closed position and an opened position by pressing down on a lever button 102. The water in the upper chamber 20 passes through the filter cartridge 26 to the lower chamber 22 due to gravity. Specifically, the water enters the filter cartridge 26 through the apertures 64, 66, 68 and 70 in the lid 30 which are shown in FIGS. 4A and 4B. The water passes through the filter media 40 which removes contaminants and impurities from the water. The filtered water then exits the filter cartridge 26 through the apertures 42, 44, 46 and 48 in the base 34, shown in FIG. 5, and accumulates in the lower chamber 22. The snug fit between the filter cartridge 26 and the lower body 96 forces the water to pass through the filter cartridge 26 in order to flow from the upper chamber 20 to the lower chamber 22. The filtered water can be poured out of the water pitcher 10 via the spout 16 for consumption.

When the filter media 40 reaches the end of its useful life, the user can simply replace the spent filter media with new filter media without the need to dispose of the entire filter cartridge 26. The filter cartridge 26 is removed from the receptacle 24 of the water pitcher 10 using the handle 60 which functions as gripping means for the user. The lid 30 is removed from the housing 28 and the spent filter media is removed from the cavity 38. In this example, the spent granular activated carbon is removed from the cavity 38, followed by the removal of the divider 45. The spent minerals are then removed from the cavity 38. New minerals are inserted into the cavity 38 and the divider 45 is replaced on top of the new minerals. The cavity 38 is then filled with new granular activated carbon and the lid 30 is replaced on the housing 28. The filter cartridge 26 is inserted back into the receptacle 24 of the water pitcher 10 and the water pitcher 10 is ready for use.

By replacing the filter media and reusing the filter cartridge, the amount of waste sent to landfills is reduced. Furthermore, the filter media may include organic material such as activated carbon which can be recycled through composting. The filter cartridge may also be made of recyclable or biodegradable material.

It will be understood by a person skilled in the art that many of the details provided above are by way of example only, and are not intended to limit the scope of the invention which is to be determined with reference to the following claims.

What is claimed is:

1. A reusable water filter cartridge comprising:
   a housing having a water-permeable base and a body extending from the base, the base and the body defining a cavity for receiving filter media;
   a water-permeable lid removably securable to the housing via interlocking connectors on the lid and the housing, the lid being securable to the housing by rotating the lid relative to the housing in a first rotational direction to engage the connectors on the lid and the housing with each other, and the lid being releasable from the housing by rotating the lid relative to the housing in a second rotational direction which is opposite to the first rotational direction to disengage the connectors on the lid and the housing from each other; and
   a removable divider received within the cavity of the housing, the divider separating a first component of the filter media from a second component of the filter media, the divider further including a disc member and a handle extending from the disc member;
   wherein water to be filtered enters the housing via the lid, passes through the filter media contained in the cavity, and exits the housing via the base.

2. The reusable water filter cartridge of claim 1, wherein the interlocking connectors include one or more male connectors on the lid operable to engage one or more female connectors on the housing.

3. The reusable water filter cartridge of claim 1, wherein the first component of the filter media comprises granular activated carbon and the second component of the filter media comprises minerals.

4. The reusable water filter cartridge of claim 1, wherein the divider is water-permeable.

5. The reusable water filter cartridge of claim 1 further including a plurality of circumferentially spaced-apart ribs extending inwardly from and about an inner wall of the body, the ribs supporting the divider within the body, wherein the ribs are located such that an outer periphery of the disc member is disposed to rest on the ribs in maintaining a position of the divider within the body.

6. The reusable water filter cartridge of claim 1, further including a plurality of circumferentially spaced-apart protrusions extending inwardly from and about the inner wall of the body, wherein the protrusions are located and shaped to allow an outer periphery of the disc member to pass over the protrusions during insertion of the divider into the body such that the protrusions are disposed to maintain a position of the divider within the body while inhibiting inadvertent removal of the divider from said position within the body.

7. The reusable water filter cartridge of claim 1, wherein at least one of the lid and the base comprises a mesh.

8. The reusable water filter cartridge of claim 1, wherein at least one of the lid and the base comprises a plurality of pores.

9. The reusable water filter cartridge of claim 1, wherein the body has a neck which defines an opening into the cavity, the neck having a shoulder which provides a seat for the lid.

\* \* \* \* \*